Patented May 19, 1936

2,041,330

UNITED STATES PATENT OFFICE 2,041,330

MANUFACTURE OF ARTIFICIAL MASSES

Alphonse Gams and Karl Frey, Basel, Switzerland, assignors, by mesne assignments, to Ciba Products Corporation, Dover, Del.

No Drawing. Application October 17, 1931, Serial No. 569,540. In Switzerland November 12, 1930

9 Claims. (Cl. 18—55)

This invention relates to the manufacture of filled artificial masses from aromatic amines and aldehydes.

It is known that the products obtained by condensing primary aromatic amines with formaldehyde in presence of acid and subsequently eliminating the acid after they have been washed, dried and comminuted, can be pressed at a raised temperature, if necessary in presence of a hardening agent, to form homogeneous artificial masses (see copending applications Serial Nos. 245,039, filed January 16, 1928; 398,267, filed October 8, 1929; and 400,154, filed Oct. 16, 1929, all owned by the assignee owner of the present application).

It has been proposed to mix these condensation products with fillers before they are pressed, either by mixing the filler with a dry powder (compare the copending application Serial No. 245,039) or by mixing the acid solution, obtained during the condensation, with a filler and then precipitating the condensation product on the filler by elimination of the acid. The latter procedure has the advantage that the objects formed by compressing the mixture made from the solution are considerably more homogeneous than those made by mechanical mixing (compare the copending application Serial No. 398,268 filed Oct. 8, 1929). As has been pointed out in the last-named specification (Example 4), this process may advantageously be applied for making loaded paper.

According to the present invention a particularly advantageous process for making artificial materials containing fillers from the condensation products prescribed in the aforesaid specifications, consists in mixing the precipitated and washed condensation product, while it is in a moist condition, with the filler, drying the mixture in any known manner and compressing it, if necessary after comminution.

This procedure has the advantage over the method of mixing the condensation product in the dry condition with the filler that a more homogeneous mixture is obtainable. It is possible by the process of the invention to obtain suspensions of any degree of fineness, even up to the colloidal form.

As compared with the process of precipitating the condensation product on the filler, the invention has the advantage that the whole mixture does not have to be washed but only the precipitated resin, so that there is a saving of labor. Moreover, an essential simplification is connected with the fact that the presence of the filler in the product to be washed creates difficulty in washing. A further advantage of the process is that fillers can be used which are attacked by acid. These advantages are of importance whether the material which is to be pressed is finally to be in the form of powder, flakes or chips, and also whether it is used in the manufacture of paper or cardboard.

In the manufacture of paper or cardboard there is also the following essential advantage:—

According to the copending application Serial No. 398,268 filed October 8, 1929 considerable dilution is necessary for the optimum impregnation of the filler so that the condensation product is precipitated in a very fine disperse form. This fine disperse form creates a certain difficulty in draining the mixture on the wire used for making the sheet. Furthermore, it is very easy to lose resin because the wire does not retain the very fine particles of resin which are in part not adherent to the filler. By the present invention, wherein the condensation product is not precipitated in presence of the filler, the conditions of precipitation, for instance the concentration of the solutions, may be so selected that the condensation product is precipitated in a relatively coarse-grained form, which is comparatively easily washed and yields with the filler a mixture, which is easily drained on any paper-making machine and from which loss of resin through the wire becomes a minimum.

The condensation products of aromatic amines with formaldehyde for use in this invention may be made in acid solution according to any of the known processes or any of those described in the aforesaid specifications; thus there may be condensed equimolecular proportions of the amine and aldehyde in presence of acid, and after the excess of acid has been removed the fusible resin first obtained is converted by addition of an aldehydic hardening agent into the infusible condition, which hardening agent if desired can be already added to the condensation components; or there may be directly made an infusible resin in a single process by using from the beginning more than an equimolecular proportion of aldehyde. As aldehydic hardening agents there may either come into consideration aldehydes themselves, such as, for example, furfural, or aldehyde condensation products, such as, for example, phenol-alcohols, cf. the copending applications Serial Nos. 398,267, filed Oct. 8, 1929, 400,154, filed Oct. 16, 1929, 548,038 and 548,039 both filed June 30, 1931. By the term "phenol-alcohols", there is meant and understood to be defined, the products resulting from the reaction of formaldehyde upon phenols in presence of cold aqueous alkali. These products are also known as methylolphenols, methylol-cresols, etc.

There may be added to the resin a fluxing agent, a plasticizing agent, a coloring matter or the like. Moreover, analogous condensation products may be used which are obtainable by treating Schiff's bases with acids, if necessary in presence of aldehydes (compare the aforesaid specifications).

As fillers various animal, vegetable or mineral materials may be used, either in the form of powder, such as wood-meal, asbestine, powdered leather or powdered cork, or in fibrous form, such as cotton, wood-pulp, sulfite cellulose, sulfate cellulose or soda cellulose, saw-dust, old paper, rags, linen, jute, silk, wool or the like. If desired the filler may be subjected to a suitable pre-treatment, such as dyeing or coloring process. The filler may be mixed with the washed and still moist resin in any suitable manner, preferably in a mixing or grinding device, such as a beater, a pulp mill, a kneading apparatus or grinding machine. In some cases the moist resin alone or in conjunction with the filler and any desired addition, such as a fluxing agent, plasticizing agent or coloring matter, may be converted into the colloidal condition with aid of suitable devices.

It may in certain cases be advantageous to mix the moist but still not washed precipitate with the filling material and only then, i. e. in presence of the filling material, to remove by washing electrolytes which may be present. It is thus possible to wash rather mucilaginously obtained resins within a short time, since owing to the filling material present loosening of the resin precipitate occurs.

The manufacture of paper from the thoroughly mixed components may be carried out according to the usual method of paper making. The said mixture constituting the pulp, if necessary after due dilution, and, in some cases, after purification by suitable devices, is formed into a paper on the endless wire or wire drum of a paper-making machine, the wire drum, when this is used, being if desired constructed as a vacuum filter; and the sheet is then couched, pressed and dried by leading it over a suitable drying apparatus, such as is well-known in the paper-making industry. The paper, cardboard or the like thus obtained, can be pressed, either alone or in several superimposed layers, at a high temperature to form completely homogeneous pieces of characteristic mechanical and electrical properties. The products are easily machined and are suitable for many purposes, for instance in making electrical insulation, as substitutes for wood in building, in machine construction, particularly the construction of textile machinery, for noiseless gears, for making acoustic instruments, or for material which is impervious to liquids, vapors or gases.

For the manufacture of other pressed objects containing fillers, the moist mixture may be directly dried and then, if necessary after suitable grinding or other form of comminution, may be compressed in the form of powder or as loose fibrous material or in sheets.

The following examples illustrate the invention, the parts being by weight:—

*Example 1*

93 parts of aniline (1 mol.) are dissolved in 100 parts of hydrochloric acid of 36.5 per cent strength (1 mol.) and 1000 parts of water. To this solution are added 98 parts of formaldehyde solution of 40 per cent strength (1.2 mols.). The red solution thus produced is kept at a temperature of about 30° C. and after ½ hour run into a solution of 41 parts of caustic soda of 98 per cent strength in 500 parts of water. The nearly white precipitate thus formed is preferably washed by suction on a rotary filter until freed from electrolytes and then intimately mixed, while still moist, (i. e. in a partially swollen state) with 100 parts of paper pulp (dry basis) which has been reduced to fibers of about 2 mm. length in a beater containing water. For this mixing, it is advantageous to use the same beater in which the paper pulp has been produced. The mixture is suitably diluted and worked up to paper on a normal Fourdrinier machine. In order to avoid loss of fiber or resin during the manufacture the machine is preferably so arranged that a complete circulation of the wash water is possible, that is to say the water running away from the wire and the wet press is collected and used for diluting the pulp fed to the machine. The dry paper may be pressed into homogeneous forms at 160° C. by a pressure of 150–200 kilos per sq. cm. If a single sheet or a thin layer of several superimposed sheets is pressed or rolled, translucent flexible sheets are obtained. When pressed in thick layers the paper yields extremely tough, homogeneous blocks. Moreover, the paper may be formed into hollow bodies, such as tubes, by a winding operation under pressure and heat.

*Example 2*

93 parts of aniline (1 mol.) are dissolved in 100 parts of hydrochloric acid of 36.5 per cent strength (1 mol.) and 500 parts of water, and to the solution are added 90 parts of formaldehyde solution of 40 per cent strength (1.1 mols.). The red solution produced is left at rest for ½ hour at 30° C. and is then run into a solution of 40 parts of caustic soda of 100 per cent strength in 1000 parts of water, whereby the condensation product separates in the form of a bright precipitate. Into the feebly alkaline aqueous suspension there is introduced so much of a solution of polyphenol-alcohol (made from 1 mol. phenol in weak alkaline solution and 2½ mols. formaldehyde) as corresponds with one-fourth mol. After stirring for a short time the polyphenol-alcohol will become adsorbed by the amine condensation product. The precipitate is washed and filtered and mixed, while moist, with a rag pulp in a beater, the dry weight of the pulp being 75 parts. The mixture is made into paper in the manner described in Example 1 on the paper-machine and pressed.

The properties of the pressed objects thus obtained are similar to those of the products of Example 1. They are particularly remarkable for their high resistance to heat.

*Example 3*

100 parts of aniline are dissolved in 500 parts of alcohol and 250 parts of glacial acetic acid, whereupon 110 parts of formaldehyde of 40 per cent strength are added. After ½ hour the condensation product is precipitated by adding water and washed free from acid. The moist precipitate is mixed with 150 parts of paper pulp (dry basis). The mixture is suitably diluted and worked up to paper on a normal Fourdrinier machine. The dry paper may be pressed into homogeneous forms at 160° C. at a pressure of 180 kilos per sq. cm.

*Example 4*

A suspension analogous to that described in Example 2 of the condensation product from 93 parts of aniline (1 mol.) and 81.5 parts of a formaldehyde solution of 40 per cent strength (1 mol.) is washed free from electrolytes and filtered by suction. The moist resin is mixed in a beater with an opened-up pulp containing 100 parts of dry sulfite cellulose. The mixture containing the filler is dried in a vacuum oven at about 60° C. and comminuted to a loose fibrous mass, which is then thoroughly mixed with 30 parts of furfural. The product thus obtained is pressed in a mold at 160–170° C. at a pressure of 150 kilos per sq. cm., whereupon there is obtained a corresponding object, which is very tough and very homogeneous.

Example 5

A precipitated condensation product, obtained as described in Example 1 from 93 parts of aniline and 98 parts of formaldehyde of 40 per cent strength is filtered and separated from the electrolytes. It is then mixed with 75 parts of ground leather waste whereupon the mass, preferably dried in a vacuum and then comminuted, is compressed under conditions similar to those described in Example 4, to form objects which are very tough, elastic and homogeneous.

Example 6

200 parts of anhydro-formaldehyde aniline are introduced into 1000 parts of glacial acetic acid, while cooling, and the whole is allowed to stand at ordinary temperature for 24 hours. 40 parts of formaldehyde of 40 per cent strength are then introduced, while stirring, and, after heating to 40° C. for 1 hour, the condensation product is precipitated by pouring into water. After elimination of the mother liquor the product is stirred with hot water and washed free from acid. The moist resin is mixed with 160 parts of paper pulp (dry basis) and worked up as indicated in Example 1.

The term "primary aromatic amine", as employed in this application, is intended to cover not only true primary aromatic amines, such as aniline and its homologues, but also such derivatives thereof which under the conditions of the condensation described herein, also act like the true primary aromatic amines, for example, anhydroformaldehydeaniline, formylaniline or the homologues of those compounds, and the like.

The expression "formaldehyde yielding compounds" as employed herein, is intended to cover not only formaldehyde itself, but its polymers or any other substances splitting off formaldehyde or capable of forming methylene links under the conditions of the condensation, as it has been found that such substances or polymers may also be used in place of formaldehyde itself.

What we claim is:—

1. The method of manufacturing filled molded synthetic resinous materials from resins obtained by reacting primary aromatic amines and a formaldehyde yielding compound in an aqueous acid solution with the subsequent elimination of the acid and the precipitation of the resin, which comprises mixing the precipitated resin, while still moist from the precipitation step, with filling material, and thereafter drying the mixture and molding it at an elevated temperature.

2. The method of manufacturing filled molded synthetic resinous materials from resins obtained by reacting aniline and a formaldehyde yielding compound in an aqueous acid solution with the subsequent elimination of the acid and the precipitation of the resin, which comprises mixing the precipitated resin, while still moist from the precipitation step, with filling material, and thereafter drying the mixture and molding it at an elevated temperature.

3. The method of manufacturing filled molded synthetic resinous materials from resins obtained by reacting primary aromatic amines and a formaldehyde yielding compound in an aqueous acid solution with the subsequent elimination of the acid and the precipitation of the resin, which comprises mixing the precipitated resin, while still moist from the precipitation step, with paper pulp, and thereafter bringing the mixture into sheet form, drying the paper sheet obtained and molding it at elevated temperature.

4. The method of manufacturing filled molded synthetic resinous materials from resins obtained by reacting primary aromatic amines and a formaldehyde yielding compound in an aqueous acid solution with the subsequent elimination of the acid and the precipitation of the resin, which comprises mixing the precipitated resin, while still moist from the precipitation step, with filling material, and thereafter drying the mixture and molding it at an elevated temperature in presence of an aldehydic compound.

5. The method of manufacturing filled molded synthetic resinous materials from resins obtained by reacting aniline and a formaldehyde yielding compound in an aqueous acid solution with the subsequent elimination of the acid and the precipitation of the resin, which comprises mixing the precipitated resin, while still moist from the precipitation step, with filling material, and thereafter drying the mixture and molding it at an elevated temperature in presence of an aldehydic compound.

6. The method of manufacturing filled molded synthetic resinous materials from resins obtained by reacting primary aromatic amines and a formaldehyde yielding compound in an aqueous acid solution with the subsequent elimination of the acid and the precipitation of the resin, which comprises mixing the precipitated resin, while still moist from the precipitation step, with an aldehydic compound and then with filling material, and thereafter drying the mixture and molding it at an elevated temperature.

7. The method of manufacturing filled molded synthetic resinous materials from resins obtained by reacting aniline and a formaldehyde yielding compound in an aqueous acid solution with the subsequent elimination of the acid and the precipitation of the resin, which comprises mixing the precipitated resin, while still moist from the precipitation step, with an aldehydic compound and then with filling material, and thereafter drying the mixture and molding it at an elevated temperature.

8. The method of manufacturing filled molded synthetic resinous materials from resins obtained by reacting aniline and a formaldehyde yielding compound in an aqueous acid solution with the subsequent elimination of the acid and the precipitation of the resin, which comprises mixing the precipitated resin, while still moist from the precipitation step, with filling material in presence of furfural, and thereafter drying the mixture and molding it at an elevated temperature.

9. The method of manufacturing filled molded synthetic resinous materials from resins obtained by reacting aniline and a formaldehyde yielding compound in an aqueous acid solution with the subsequent elimination of the acid and the precipitation of the resin, which comprises mixing the precipitated resin, while still moist from the precipitation step, with filling material in presence of phenol alcohols, and thereafter drying the mixture and molding it at an elevated temperature.

ALPHONSE GAMS.
KARL FREY.